US010048924B2

(12) United States Patent
Felkai et al.

(10) Patent No.: US 10,048,924 B2
(45) Date of Patent: *Aug. 14, 2018

(54) FACILITATION OF CONCURRENT CONSUMPTION OF MEDIA CONTENT BY MULTIPLE USERS USING SUPERIMPOSED ANIMATION

(71) Applicant: Intel Corporation, Santa Clara, CA (US)

(72) Inventors: Paul I. Felkai, San Jose, CA (US); Annie Harper, Santa Clara, CA (US); Ratko Jagodic, Santa Clara, CA (US); Rajiv K. Mongia, Redwood City, CA (US); Garth Shoemaker, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/276,528

(22) Filed: Sep. 26, 2016

(65) Prior Publication Data

US 2017/0046114 A1    Feb. 16, 2017

Related U.S. Application Data

(63) Continuation of application No. 13/532,612, filed on Jun. 25, 2012, now Pat. No. 9,456,244.

(51) Int. Cl.
*G06F 3/14* (2006.01)
*H04N 21/4788* (2011.01)
(Continued)

(52) U.S. Cl.
CPC ............ *G06F 3/1454* (2013.01); *G06F 3/013* (2013.01); *G06F 3/1423* (2013.01); *G06T 11/60* (2013.01);
(Continued)

(58) Field of Classification Search
CPC .................................................... G06F 3/1454
(Continued)

(56) References Cited

U.S. PATENT DOCUMENTS 6,559,866 B2    5/2003   Kolde et al.
6,742,083 B1    5/2004   Greicar
(Continued)

FOREIGN PATENT DOCUMENTS

CN        102450031 A    5/2012
JP        2004-112511 A   4/2004
(Continued)

OTHER PUBLICATIONS

"No Jitter—Post—Innovation Showcase 2012 Announced", www.nojitter.com/post/232601811/innovation-showcase-2012-announced, 3 pages.
(Continued)

*Primary Examiner* — Susan McFadden
(74) *Attorney, Agent, or Firm* — Schwabe, Williamson & Wyatt, P.C.

(57) ABSTRACT

Embodiments of apparatus, computer-implemented methods, systems, devices, and computer-readable media are described herein for facilitation of concurrent consumption of media content by a first user of a first computing device and a second user of a second computing device. In various embodiments, facilitation may include superimposition of an animation of the second user over the media content presented on the first computing device, based on captured visual data of the second user received from the second computing device. In various embodiments, the animation may be visually emphasized on determination of the first user's interest in the second user. In various embodiments, facilitation may include conditional alteration of captured visual data of the first user based at least in part on whether
(Continued)

the second user has been assigned a trusted status, and transmittal of the altered or unaltered visual data of the first user to the second computing device.

25 Claims, 6 Drawing Sheets

(51) Int. Cl.
*H04N 21/431* (2011.01)
*H04N 21/442* (2011.01)
*G06F 3/01* (2006.01)
*G06T 11/60* (2006.01)
*G06T 13/80* (2011.01)
*G10L 15/26* (2006.01)
*G06T 5/00* (2006.01)

(52) U.S. Cl.
CPC .............. *G06T 13/80* (2013.01); *G10L 15/26* (2013.01); *H04N 21/4312* (2013.01); *H04N 21/44218* (2013.01); *H04N 21/4788* (2013.01); *G06T 5/002* (2013.01); *G06T 2207/20224* (2013.01); *G06T 2210/22* (2013.01); *G09G 2340/12* (2013.01); *G09G 2358/00* (2013.01); *G09G 2370/04* (2013.01)

(58) Field of Classification Search
USPC ......................................................... 704/235
See application file for complete search history.

(56) References Cited

U.S. PATENT DOCUMENTS

| | | | |
|---|---|---|---|
| 9,197,848 | B2 | 11/2015 | Felkai et al. |
| 9,456,244 | B2 * | 9/2016 | Felkai .................. G06F 3/1423 |
| 2010/0115426 | A1 | 5/2010 | Liu et al. |
| 2012/0036433 | A1 | 9/2012 | Zimmer et al. |

FOREIGN PATENT DOCUMENTS

| | | |
|---|---|---|
| JP | 2006-197217 A | 7/2006 |
| JP | 2007104193 A | 4/2007 |
| JP | 2009536406 A | 10/2009 |
| KR | 101109157 B1 | 2/2012 |
| KR | 1020120031168 A | 3/2012 |
| WO | WO2010/138798 | 12/2010 |

OTHER PUBLICATIONS

"Be Present with Nuvixa—Fusion", www.blogs.amd.com/fusion/2012/03/05/be-present-with-nuvixa/, 2 pages.
"AMD and Nuvixa Bring New, Immersive Dimension to Telepresence", www.amd.com/us/press-releases/Pages/amd-and-nuvixa-bring-2012mar6.aspx, 1 page.
"GraphicSpeak—Nuvixa Stage Presence uses Kinect to insert people into presenttations", http://gfxspeak.com/2012/03/08/nuvixa-stagepresence-uses-kinect-to-insert-people-into-presentations/, pages.
"Nuvixa™ Launches Stagepresence at Educause 2011", https://vix.tv/press/2, 1 page.
"Nu I A™—Nuvixa wins innovation showcase", https://vix.tv/press/3, 1 page.
"Nuvixa™ Named Finalist for Illinois Technology Association Citylights Award", https://vix.tv/press/1, 1 page.
International Search Report and Written Opinion dated Sep. 2, 2013 for International Application No. PCT/US2013/041854, 9 pages.
International Preliminary Report on Patentability dated Jan. 8, 2015, for International Application No. PCT/US2013/041854, 6 pages.
Office Action dated Dec. 1, 2015 for Japanese Patent Application No. 2015-514091, 7 pages.
Non-Final Office Action dated Feb. 2, 2016, issued in corresponding U.S. Appl. No. 13/532,612.
Notice of Allowance dated Jun. 8, 2016, issued in corresponding U.S. Appl. No. 13/532,612.

* cited by examiner

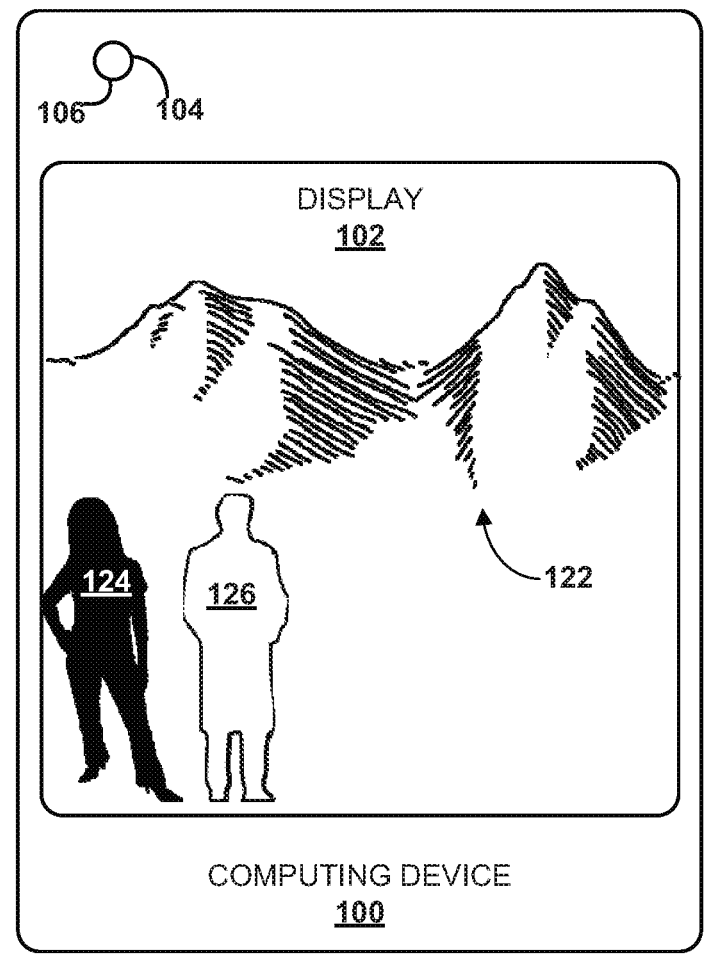
Fig. 2
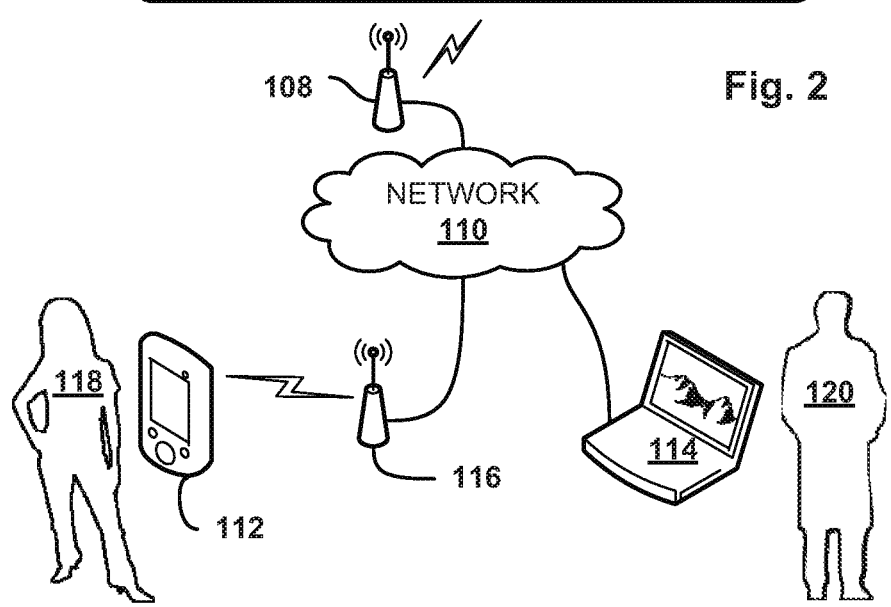

FACILITATION OF CONCURRENT
CONSUMPTION OF MEDIA CONTENT BY
MULTIPLE USERS USING SUPERIMPOSED
ANIMATION

RELATED APPLICATION

This application is a continuation application of U.S. patent application Ser. No. 13/532,612, entitled "FACILITATION OF CONCURRENT CONSUMPTION OF MEDIA CONTENT BY MULTIPLE USERS USING SUPERIMPOSED ANIMATION," filed Jun. 25, 2012, now U.S. Pat. No. 9,456,244; and claims priority to said Application, which Specification is hereby fully incorporated by reference.

FIELD

Embodiments of the present invention relate generally to the technical field of data processing, and more particularly, to facilitation of concurrent consumption of media content by multiple users using superimposed animation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

People may wish to consume media content together. For instance, a group of friends may gather together to watch a movie, television show, sporting event, home video or other similar media content. The friends may engage with one another during the presentation to enhance the media consumption experience. Two or more people who are physically separate from each other and who are unable to gather in a single location may nevertheless wish to share a media content consumption experience.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 2 schematically depicts the scenario of FIG. 1, where a user of the computing device has indicated interest in a particular superimposed animation of a remote user, in accordance with various embodiments.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
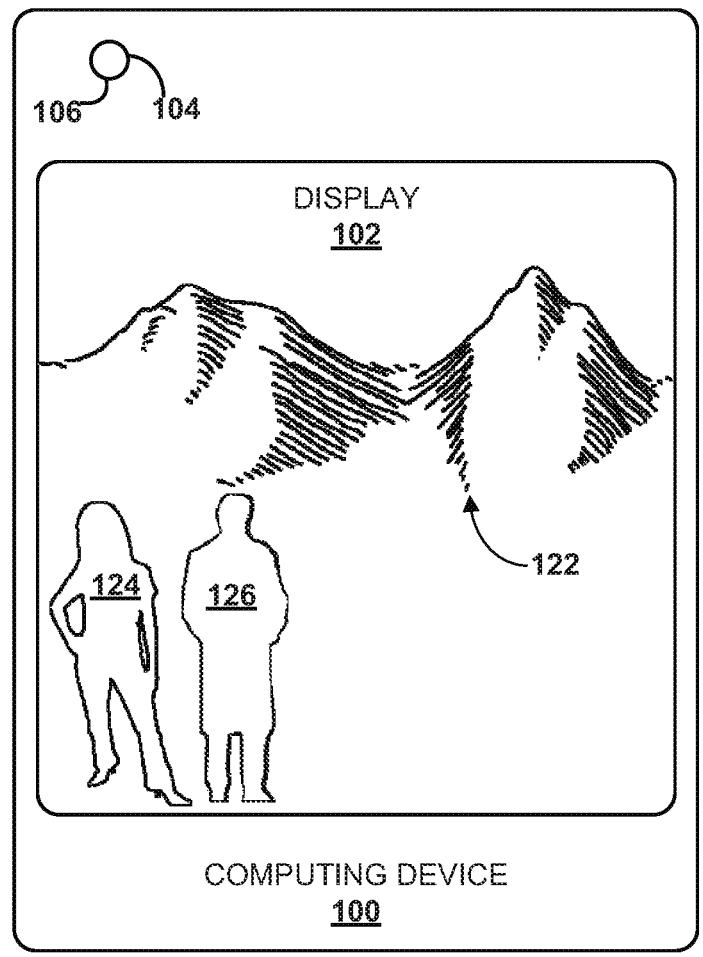
FIG. 1 schematically illustrates an example computing device configured with applicable portions of the teachings of the present disclosure, in communication with other similarly-configured remote computing devices, in accordance with various embodiments.
Figure 1:
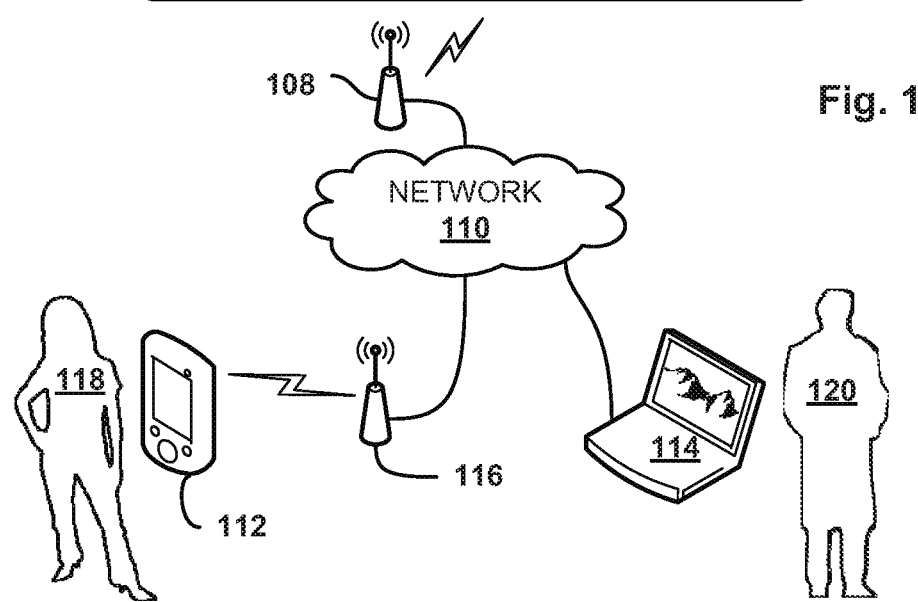

FIG. 1 schematically depicts an example computing device 100 configured with applicable portions of the teachings of the present disclosure, in accordance with various embodiments. Computing device 100 is depicted as a tablet computing device, but that is not meant to be limiting. Computing device 100 may be various other types of computing devices (or combinations thereof), including but not limited to a laptop, a netbook, a notebook, an ultrabook, a smart phone, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, a digital video recorder, a television (e.g., plasma, liquid crystal display or "LCD," cathode ray tube or "CRT," projection screen), and so forth.

Computing device 100 may include a display 102. Display 102 may be various types of displays, including but not limited to plasma, LCD, CRT, and so forth. In some embodiments (not shown), display may include a projection surface onto which a projector may project graphics with superimposed animations as described herein. In various embodiments, display 102 may be a touch screen display that may be usable to provide input to and operate computing device 100. In various embodiments, computing device 100 may include additional input controls (not shown) to facilitate input in addition to or instead of via a touch screen display.

In various embodiments, computing device 100 may include a camera 104 configured to capture visual data, e.g., one or more frames and/or digital images. As will be described below, the captured visual data may be transmitted to remote computing devices and used to facilitate superimposition of animation over other content by the remote computing devices.

Figure 3:
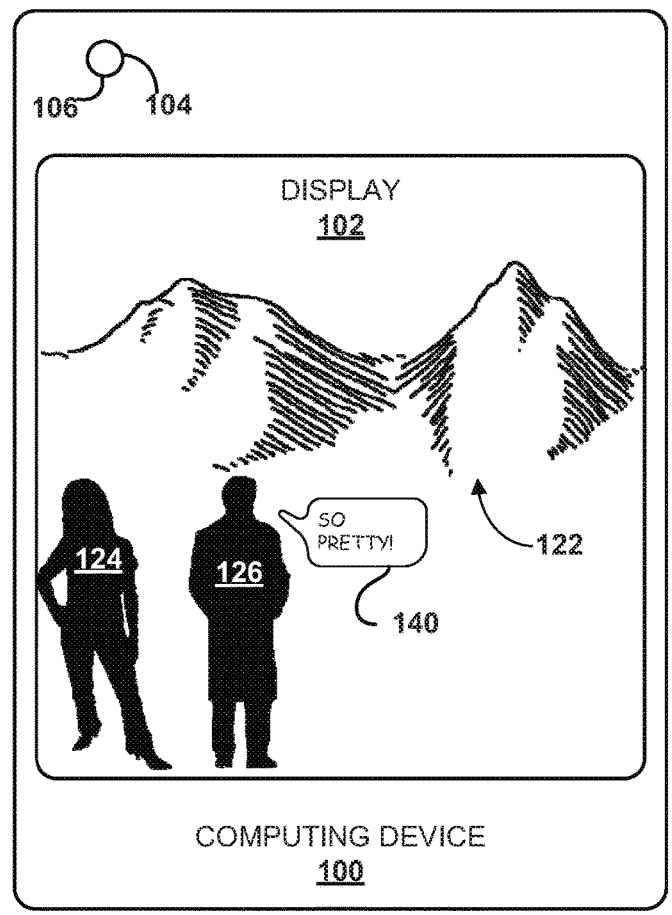
FIG. 3 schematically depicts the scenario of FIG. 1, where a user of the computing device has indicated interest in a media content over superimposed animations of remote users, in accordance with various embodiments.
Figure 3:
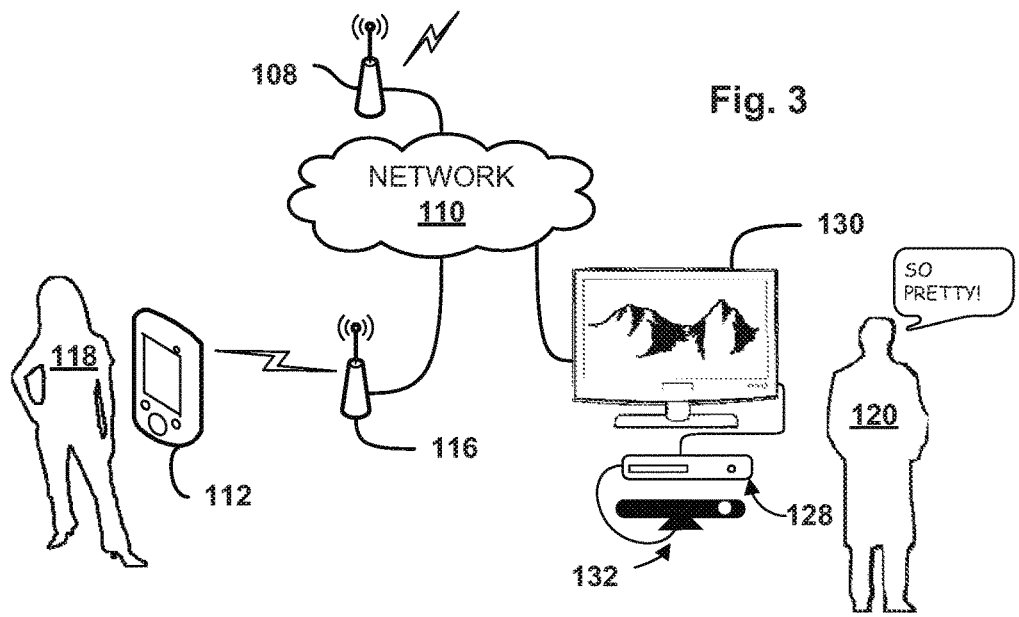

Although camera 104 is shown as an integral part of computing device 100 in FIGS. 1-3, this is not meant to be limiting. In various embodiments, camera 104 may be separate from computing device 100. For example, camera 104 may be an external camera (e.g., a web camera) connected to computing device 100 using one or more wires or wirelessly.

In various embodiments, computing device 100 may include an eye tracking device 106. In various embodiments, such as the computing tablet shown in FIG. 1, camera 104 also operates as eye tracking device 106. However, this is not required. In various embodiments, eye tracking device 106 may be separate from camera 104, and may be a different type of device and/or a different type of camera. For example, in embodiments where computing device 100 is a television or a gaming console attached to a television, eye tracking device 106 may be a camera or other device (e.g., a motion capture device) operably coupled to the television or gaming console. Such an example is shown in FIG. 3 and will be described below.

In various embodiments, visual data captured by camera 104 and/or eye tracking device 106 may be analyzed using software, hardware or any combination of the two to determine and/or approximate what portion of display 102, if any, at which a user is looking. This determination may include various operations, including but not limited to determining a distance between a user's face and/or eyes and display 102, identifying one or more features of the user's eyes such as pupils in the visual data, measuring a distance between the identified features, and so forth. As will be discussed below, a determination of which portion of display 102 a user is looking at (and therefore has indicated interest), as well as which portion of display 102 a user is not looking at (and therefore has indicated disinterest), may be used in various ways.

Computing device 100 may be in communication with various remote computing devices via one or more networks. In FIGS. 1 and 2, for instance, computing device 100 is in wireless communication with a first radio network access node 108, which itself is in communication with a network 110. In various embodiments, first radio access node 108 may be an evolved Node B, a WiMAX (IEEE 802.16 family) access point, a Wi-Fi (IEEE 802.11 family) access point, or any other node to which computing device 100 may connect wirelessly. Network 110 may include one or more personal, local or wide area, private and/or public networks, including but not limited to the Internet. Although computing device 100 is shown wirelessly connected to network 110, this is not meant to be limiting, and computing device 100 may connect to one or more networks in any other manner, including via so-call "wired" connections.

Computing device 100 may be in network communication with any number of remote computing devices. In FIGS. 1 and 2, for instance, computing device 100 is in network communication with a first remote computing device 112 and a second remote computing device 114. As was the case with computing device 100, first and second remote computing devices 112, 114 may be any type of computing device, such as those mentioned previously. For instance, in FIG. 1, first remote computing device 112 is a smart phone and second remote computing device 114 is a laptop computer.

First remote computing device 112 is shown wirelessly connected to another radio network access node 116. Second remote computing device 114 is shown connected to network 110 via a wired connection. However, the type of network connection used by remote computing devices is not material. Any computing device may communicate with any other computing device in manners described herein using any type of network connection.

In various embodiments, computing device 100 may be configured to facilitate concurrent consumption of a media content 122 by a user (not shown) of computing device 100 with one or more users of one or more remote computing devices, such as a first remote user 118 of first remote computing device 112 and/or a second remote user 120 of second remote computing device 114. In various embodiments, computing device 100 may be configured to superimpose one or more animations of remote users over media content 122 presented on computing device 100.

In various embodiments, the one or more superimposed animations may be rendered by computing device 100 based on visual data received from the remote computing devices. In various embodiments, the visual data received from the remote computing devices may be based on visual data of the remote users (e.g., 118, 120) captured at the remote computing devices.

As used herein, the term "animation" may refer to any moving visual representation created from captured visual data. This may include but is not limited to a video (e.g., bitmap) reproduction of captured visual data, artistic interpretations of visual data (e.g., a cartoon rendered based on captured visual data of a user), and so forth. Put another way, "animation" is used herein as the noun form of the verb "animate," which means "bring to life." Thus, an "animation" refers to a depiction or rendering that is "animate" (alive or having life) as opposed to "inanimate." "Animation" is not limited to a drawing created by an animator.

In various embodiments, the media content 122 may include but is not limited to audio and/or visual content such as videos (e.g., streaming), video games, web pages, slide shows, presentations, and so forth.

By superimposing animations of remote users over the media content, two or more users who are remote from each other may be able to consume the media content "together." Each user may see an animation of the other user superimposed over the media content. Thus, for instance, two or more friends that are remote from each other may share the experience of watching a movie, television show, sporting event, and so forth.

In FIG. 1, a first animation 124 and a second animation 126, representing first remote user 118 and second remote user 120, respectively, are superimposed over media content 122 on display 102 of computing device 100. First animation 124 may be based on captured visual data of first remote user 118 received by computing device 100 from first remote computing device 112, e.g., from a camera (not shown) on first remote computing device 112. For example, first animation 124 may be a video stream that depicts first remote user 118. Second animation 126 similarly may be based on captured visual data of second remote user 120 received at computing device 100 from second remote computing device 114.

In various embodiments, visual data upon which animations are rendered may be transmitted between computing devices in various forms. In various embodiments, one computer may transmit captured visual data to another computer in bitmap form (e.g., a video stream of *.png or other visual files with an alpha mask). In other embodiments, the captured visual data may be transmitted using streaming video with incorporated alpha. In yet other embodiments, the captured visual data may be transmitting using a stream of bitmap (e.g., RGB) frames and depth frames, from which either two-dimensional ("2D") or three-dimensional ("3D") animation may be rendered.

In FIGS. 1-3, the animations are rendered near the bottom of display 102, so that a user of computing device 100 may still be able to view media content 122. However, this is not meant to be limiting. Animations such as first animation 124 and second animation 126 may be rendered on any portion of display 102. In some embodiments, animations may be displayed on multiple displays. For example, if a desktop computer user has multiple monitors, one or more of the animations may be displayed on one monitor or the other. In various embodiments, these animations may be superimposed over content 122 on one or both monitors.

In various embodiments, a particular animation may be visually emphasized on determination by computing device 100 of the user's interest in that animation. As used herein, to "visually emphasize" an animation may refer to rendering the animation differently than other superimposed animations or media content, so as to draw attention to or otherwise differentiate one animation over one or more other animations.

In FIG. 1, for instance, first and second animations 124, 126 are depicted in white with black outline to represent that both animations being visually emphasized equally, so that the user's attention is not drawn to one more than the other. For example, both animations may depict the first and second users in real time and may be rendered in more or less an equally conspicuous manner. Put another way, neither animation is "visually deemphasized."

To be "visually deemphasized" may refer to rendering an animation of a remote user in a manner that does not draw attention to it, or that differentiates it from other animations or media content in a manner that directs attention away from it, e.g., to another animation that is being visually emphasized or to underlying media content. An example of visual de-emphasis is shown in FIG. 2. First animation 124 is shown in all black to represent that it is being visually deemphasized. Second animation 126 is shown in white with black outline to indicate that it is being visually emphasized.

In various embodiments, an animation of a remote user may be visually deemphasized in various ways. For example, rather than rendering a full-color or fully featured animation of the user, a silhouette of the remote user, e.g., in a single color (e.g., gray, black, or any other color or shade) may be rendered. In various embodiments, the remote user may be rendered in shadow. In some embodiments, a visually-deemphasized animation may not be animated at all, or may be animated at a slower frame rate than a visually emphasized animation.

In FIG. 3, both first animation 124 and second animation 126 are visually deemphasized. This may occur when a user of computing device 100 has not indicated interest in either user. For example, the user may have indicated interest in viewing media content 122, rather than animations of the remote users. When the user indicates interest in one or other of the animations, then the animation in which the user shows interest may be visually emphasized by computing device 100.

A user may indicate interest or disinterest in a particular animation or other portion of display 102 in various ways. For instance, camera 104 and/or eye tracking device 106 may be configured to collect data pertinent to the user's eye movements. Based on this data, computing device 100 may calculate which portion of display 102, if any, the user is looking at.

For example, in FIG. 2, computing device 100 may have determined, based on input from eye tracking device 106, that the user is focusing on (or looking at) second animation 126. Accordingly, computing device 100 may visually emphasize second animation 126 and visually deemphasize first animation 124.

As another example, in FIG. 3, computing device may have determined, based on input from eye tracking device 106, that the user is focusing on media content 122, and/or not focusing on either first animation 124 or second animation 126. Accordingly, computing device 100 may visually deemphasize both first animation 124 and second animation 126, facilitating less distracted viewing of media content 122.

Although not shown in FIGS. 1-3, first remote computing device 112 and second remote computing device 114 may concurrently display media content 122 and superimpositions of animations of other remote users, similar to computing device 100. For example, first remote computing device 112 may superimpose an animation of a user (not shown) of computing device 100 and second remote user 120 over media content 122. Likewise, second remote computing device 114 may superimpose an animation of the user (not shown) of computing device 100 and first remote user 118 over media content 122. Moreover, while three computing devices are shown, it should be understood that any number of computing devices configured with applicable portions of the present disclosure may participate in a concurrent media content viewing sessions.

While the animations shown in the Figures depict entire bodies of the remote users, this is not meant to be limiting. In various embodiments, less than a remote user's entire body may be rendered. For instance, in some embodiments, a portion of a remote user, such as the torso up (e.g., a "bust" of the remote user), may be depicted. In some cases, the animation may be rendered adjacent the bottom of the display so that the animation of the remote user appears to have "popped up: from the bottom of the display. Other portions of remote users may also be animated, such as just a head, from the chest up, from the knees or thighs up, one half or another of the remote user, and so forth.

In some embodiments, computing device 100 may be configured to crop captured visual data of remote users and/or resulting animations. For example, captured visual data of a remote user may include the remote user's entire body and a background. In various embodiments, computing device 100 may be configured to automatically crop away unwanted portions, such as the remote user's legs and/or empty space in the background.

In various embodiments, computing device 100 may be configured to dynamically and/or automatically crop captured visual data of its own local user or remote users based on various criteria. For instance, computing device 100 may dynamically crop at least some of the visual data of a local user of computing device 100 or visual data of a remote user based on a determination that a region of the visual data in which the local or remote user is represented occupies less than a predetermined portion of the entirety of the visual data. If the local or remote user moves around, e.g., closer to his or her camera, the local or remote user may become bigger within the field of view. In such case, computing device 100 may dynamically reduce cropping as needed. Thus, computing device 100 may ensure that, in visual data it provides to remote computing device, as well as in visual data it receives from remote computing devices, the animation of the user (local or remote) is of an appropriate size and proportion.

In various embodiments, computing device 100 may render, in addition to animations of remote users, an animation of the local user of computing device 100. This may permit the user to see what remote users would see. This may also enhance a sense of community by placing an animation of the local user in a "common area" with animations of remote users. This may also facilitate decision making by the user as to his or her privacy, as will be discussed further below.

In various embodiments, a concurrent media content sharing session may be implemented using peer-to-peer and/or client-server software installed on each computing device. In various embodiments, a concurrent media content sharing session may persist even if one or more users signs out of the session. For instance, in FIG. 1, if first remote user 118 were to sign off, first animation 124 on computing device 100 may disappear, but second animation 126 may persist so long as computing device 100 and second remote computing device 114 maintain a concurrent media content sharing session.

In various embodiments, users may be able to join (or rejoin) an existing concurrent media content sharing session. For instance, in FIGS. 1 and 2, second remote user 120 is participating via a laptop computer. However, in FIG. 3, second remote user 120 may have signed out of the concurrent media content sharing session on the laptop computer and may have rejoined using a third remote computing device 128 (configured with applicable portion of the present disclosure).

In FIG. 3, third remote computing device 128 is in the form of a gaming console attached to a television 130. In this arrangement, television 130 may serve a similar function as display 102 of computing device 100. Third remote computing device 128 may also be operably coupled to a motion sensing device 132. In various embodiments, motion sensing device 132 may include a camera (not shown). In various embodiments, motion sensing device 132 may include an eye tracking device (not shown).

In various embodiments, in addition to superimposing animations, computing device 100 may receive audio or other data from remote computing devices and present it to a user. For example, a remote computing device (e.g., 112, 114, 128) may be equipped with a microphone (not shown) to record a remote user's (e.g., 118, 120) voice. The remote computing device may digitize the receive audio and transmit it to computing device 100. Computing device 100 may audibly render the received audio data, e.g., in conjunction with the animations (e.g., 124, 126).

When multiple users are concurrently sharing a media content, a user may wish to prevent audio from remote users from interrupting the media content's audio component. Accordingly, in various embodiments, a user may be able to disable (e.g., mute) audio from one or more remote users, even while still permitting animations of those remote users to appear on display 102. In various embodiments, computing device 100 may be configured to superimpose, over media content 122 on display 102, textual manifestation of speech of one or more remote users. An example of this is seen in FIG. 3, where a call-out balloon 140 has been superimposed over media content 122, to display textual manifestation of a comment made by second remote user 120.

In various embodiments, the textual manifestation of speech by a remote user at computing device 100 may be based on speech-to-text data received from the remote computing device. In various other embodiments, the textual manifestation of speech by the remote user may be based on audio data received by computing device 100 from the remote computing device. In the latter case, computing device 100 may be configured to utilize speech-to-text software to convert the received audio to text.

Media may be concurrently consumed by multiple users in various ways. In various embodiments, a streaming video or other media content may be synchronized among a plurality of computing devices (e.g., 100, 112, 114, 128), so that all users see the same content at the same time. Media content may be distributed in various ways. In some embodiments, a first user may have the media content and may provide it to other users. For example, a user of computing device 100 may have an account for streaming video (e.g., subscription on-demand video stream) and may forward copies of the stream to remote computing devices (e.g., 112, 114, 128). In such case, the first user's computing device may insert a delay in its playback of the video stream, so that it does not get ahead of the video stream playback on the remote computing devices.

In other embodiments, the media content may be centrally located (e.g., at a content server), and the computing devices may individually connect to and stream from the content server. In such case, the computing devices may exchange synchronization signals to ensure that each user is seeing the same content at the same time. In some embodiments, if a user pauses playback of a media content on computing device 100, then playback of the content may be paused on other participating computing devices, e.g., remote computing devices 112, 114, 128.

In various embodiments, privacy mechanisms may be employed to protect a user's privacy. For instance, a user of computing device 100 may instruct computing device 100 to only provide, e.g., to remote computing devices (e.g., 112, 114), visual data sufficient for the remote computing device to render a silhouette or shadow animation of the user. In some embodiments, a user may direct computing device 100 to provide no captured visual data at all. In some embodiments, the user may direct computing device 100 to only capture visual data during certain time periods and/or to refrain from capturing or alter/distort visual data during other time periods.

In some embodiments, computing device 100 may employ one or more image processing filters to cause an animation of the user rendered on a remote computing device to be unrecognizable and/or less than fully rendered. For example, visual data captured by camera 104 of computing device 100 may be passed through one or more image processing filters to blur, pixelize, or otherwise alter the visual data. In some embodiments, a user may direct computing device 100 to remove some frames from the captured visual data, to cause the resulting animation to have a reduced frame rate. Additionally or alternatively, computing device 100 may reduce a sampling rate of camera 104 to capture coarser visual data.

In some embodiments, computing device 100 may be configured, e.g., responsive to an instruction received from a remote computing device (e.g., 112, 114), to protect the privacy of a remote user. For instance, computing device 100 may be configured to alter (e.g., by passing through an image processing filter) what would otherwise be fully renderable visual data representative of a remote user, so that a resulting animation of the remote user is unrecognizable or otherwise less than fully rendered.

In various embodiments, a user may assign a trusted status to one or more remote users. Those remote users may thereafter be considered one of the user's "contacts." When one of the user's contacts joins or rejoins a concurrent media content viewing session, an animation of the contact may appear, reanimate, or otherwise change in appearance. When one of the user's contacts leaves a concurrent media content viewing session, an animation of the contact may disappear, become prone, or otherwise change in appearance.

In some embodiments, computing device 100 may conditionally alter visual data transmitted to remote computing devices dependent on whether a remote user of a destination remote computing device has been assigned a trusted status. For instance, computing device 100 may send "full" or unaltered visual data to contacts of a user, or to specific contacts that are assigned an even higher trusted status above other contacts (e.g., "close friends"). Computing device 100 may send less than full visual data (e.g., visual data with frames removed or captured with a reduced sampling rate) or altered visual data (e.g., blurred, pixilated, etc.) to contacts that are considered further removed (e.g., acquaintances). In some embodiments, computing device 100 may send little-to-no visual data, or heavily-altered visual data, to remote computing devices of users who have not been assigned trusted status.

In various embodiments, computing device 100 may require execution of a handshake procedure with a remote computing device (e.g., 112, 114) before computing device 100 will superimpose an animation of a remote user over media content or provide a remote computing device with captured visual data of a user. For example, a user of computing device 100 may be required to click on or otherwise select an icon or other graphic representing a remote user before computing device 100 will superimpose an animation of the remote user over media content, or provide the remote computing device with visual data. In some embodiments, computing device 100 may superimpose animations of a users "closest" contacts (e.g., contacts that a user has assigned a relatively high level of trust), or provide the closest contacts with captured visual data of the user, without requiring any handshaking.

In some embodiments, image processing may be applied to visual data for purposes other than privacy. For instance, in some embodiments, background subtraction may be implemented by computing device 100 to "cut out" a user and subtract the background from visual data. When a remote computing device uses the visual data to superimpose an animation of the user, the user may be rendered in isolation, without any background.

In various embodiments, superimposed animations such as first animation 124 and second animation 126 may be rendered in 2D and/or 3D. In embodiments that render the animations in 3D, computing device 100 may be configured to employ parallax correction on superimpositions of animations of remote users. In some 3D embodiments, captured visual data (from which the animations are based) may be transmitted between computing devices as a point cloud, a list of vertices, a list of triangles, and so forth.

In embodiments where computing device 100 is configured to render the animations in 3D, computing device 100 may do so in various ways. For example, in some embodiments, computing device 100 may render 3D geometry on a 2D screen. In other 3D embodiments, computing device 100 may render 3D geometry on a stereoscopic display, in 3D, and the user may wear 3D glasses.

The superimpositions of animations of remote users may be rendered on display 102 in various ways. In various embodiments, the superimposition of an animation of a remote user may be rendered in a transparent window that itself is superimposed over all or a portion of other content displayed on display 102.

Figure 4:
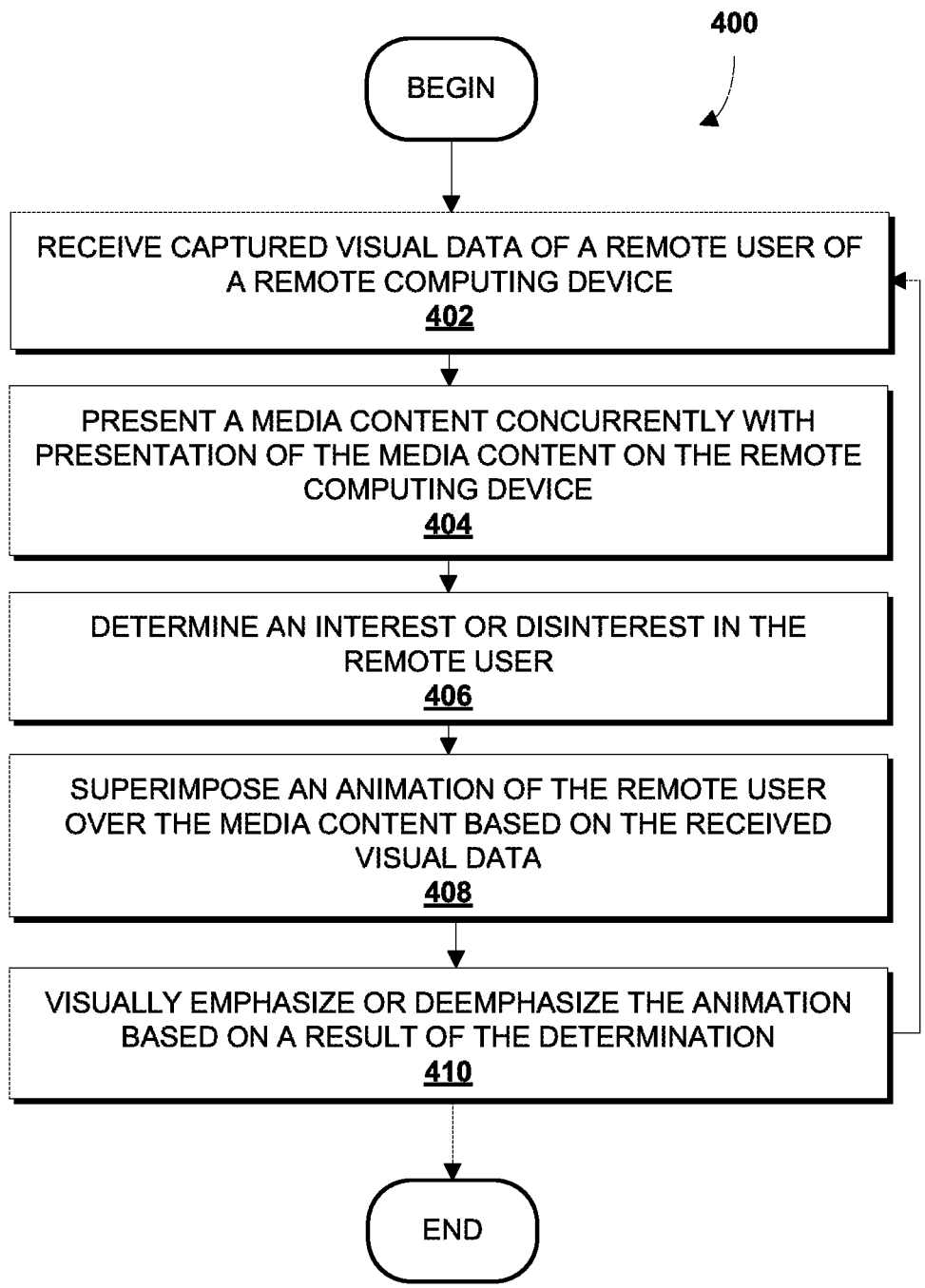
FIG. 4 schematically depicts an example method that may be implemented by a computing device, in accordance with various embodiments.

FIG. 4 depicts an example method 400 that may be implemented on a computing device, such as computing device 100, first remote computing device 112, second remote computing device 114, and/or third remote computing device 128. At block 402, captured visual data of a remote user of a remote computing device may be received, e.g., by computing device 100, from the remote computing device. At block 404, a media content (e.g., a video, shared web browsing session, slide show, etc.) may be presented, e.g., by computing device 100, concurrently with presentation of the media content on the remote computing device.

At block 406, an interest or disinterest of a user of the computing device in the remote user may be determined, e.g., by computing device 100. For instance, computing device 100 may receive data from an eye tracking device (e.g., 106) that computing device 100 may use to determine where a user is looking. If an animation of a remote user is at or within a particular distance from that location, then it may be determined, e.g., by computing device 100, that the user is interested in the remote user.

At block 408, an animation of the remote user may be superimposed, e.g., by computing device 100, over the media content (e.g., 122) based on the received visual data. At block 410, the animation may be visually emphasized or deemphasized, e.g., by computing device 100, based on a result of the determination of the user's interest. For instance, if the user is interested in the remote user, the remote user's animation may be fully rendered. If the user is not interested in the remote user, then the remote user's animation may be less-than-fully rendered, e.g., in shadow, at a lower frame rate, pixelized, and so forth. After block 410, if the concurrent media sharing session is still ongoing, then method 400 may proceed back to block 402. If the session is terminated, then method 400 may proceed to the END block.

Figure 5:
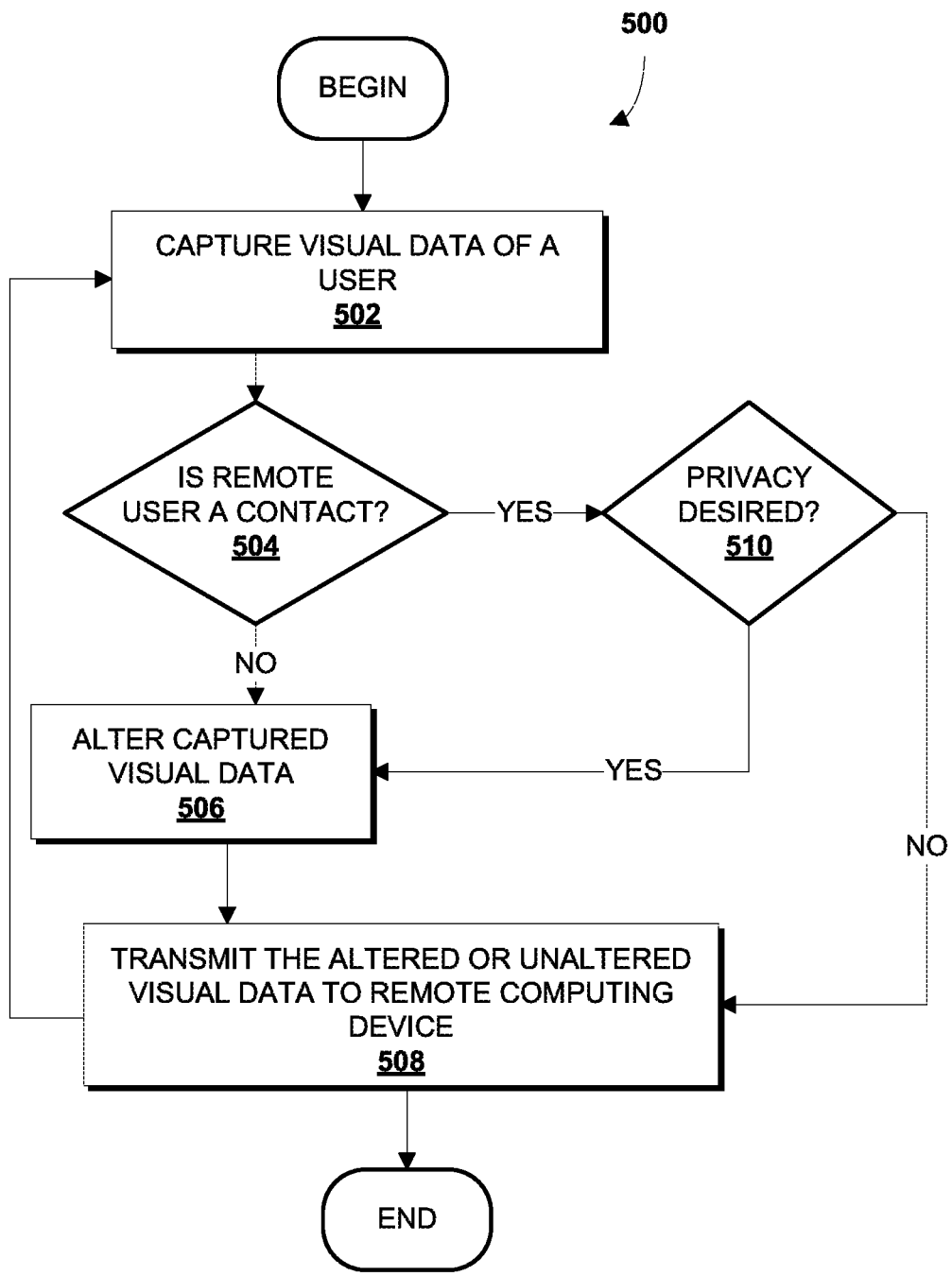
FIG. 5 schematically depicts another example method that may be implemented by a computing device, in accordance with various embodiments.

FIG. 5 depicts an example method 500 that may be implemented on a computing device such as computing device 100, first remote computing device 112, second remote computing device 114, and/or third remote computing device 128. At block 502, visual data may be captured, e.g., by camera 104. At block 504, it may be determined, e.g., by computing device 100, whether one or more remote users with which a user of computing 100 wishes to concurrently consume media content is included in a list of remote users having a trusted status (e.g., contacts). If the answer is no, then at block 506, the captured visual data of the user may be altered, e.g., by computing device 100, to maintain the user's privacy. For instance, the visual data may be fed through one or more image processing filters (e.g., blur filter, pixelization filter) or otherwise altered to cause the resulting animation on a remote computing device to be unrecognizable, distorted and/or less than fully revealing. At block 508, the altered visual data may be transmitted, e.g., by computing device 100, to the remote computing device (e.g., 112, 114, 128). After block 508, if the concurrent media sharing session is still ongoing, then method 500 may proceed back to block 502. If the session is terminated, then method 500 may proceed to the END block.

If the answer at block 504 is yes, then at block 510, it may be determined, e.g., by computing device 100, whether the user desires privacy. For instance, computing device 100 may determine whether a privacy flag has been set, or if the current time is within a time period that the user has indicated a desire for privacy. If the user desires privacy, then method 500 may proceed to block 506, and the visual data may be altered prior to transmission to protect the user's privacy. If the answer at block 510 is no, then the unaltered visual data may be transmitted, e.g., by computing device 100, to one or more remote computing devices (e.g., 112, 114, 128) at block 508.

Figure 6:
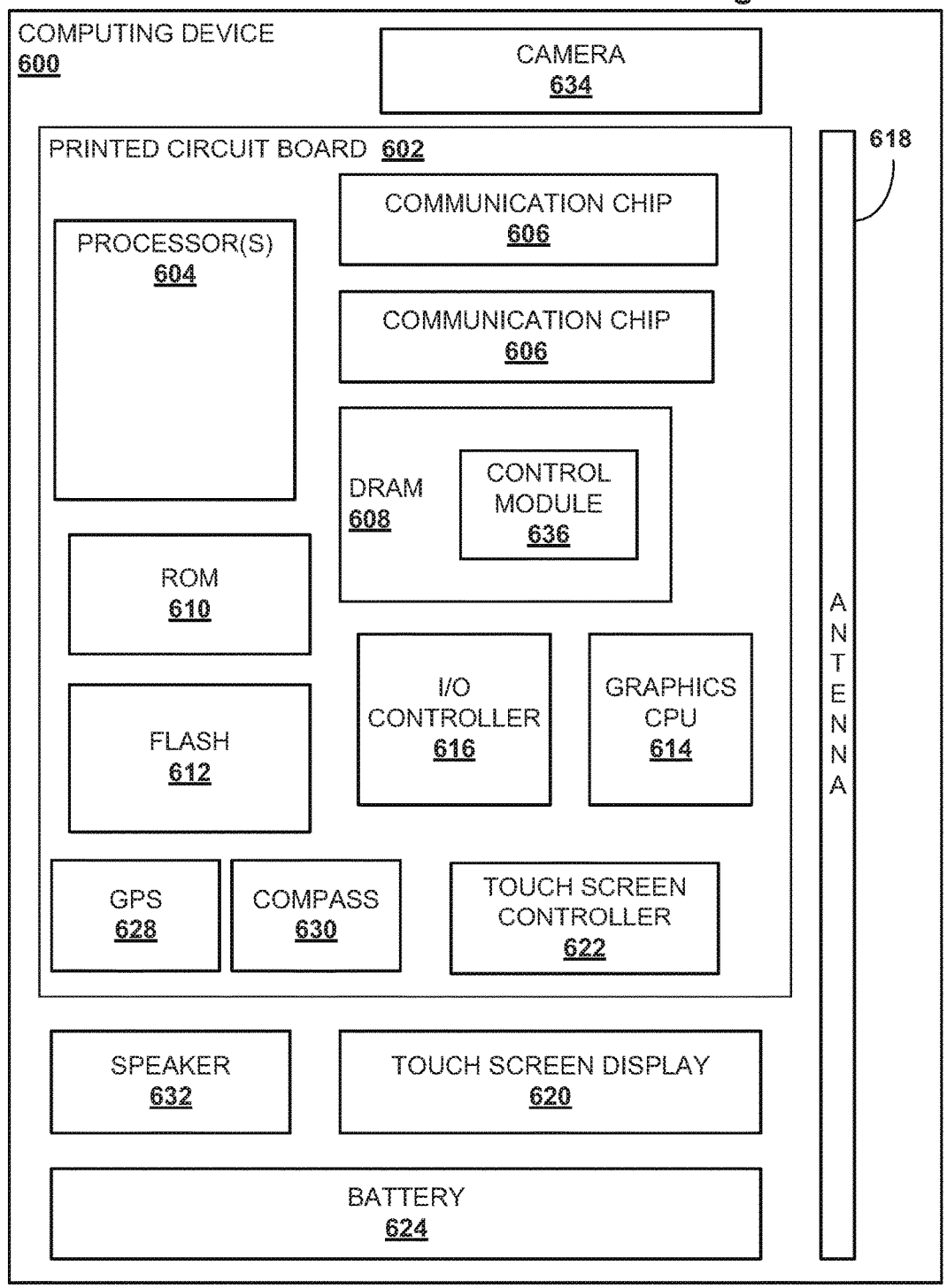
FIG. 6 schematically depicts an example computing device on which disclosed methods and computer-readable media may be implemented, in accordance with various embodiments.

FIG. 6 illustrates an example computing device 600, in accordance with various embodiments. Computing device 600 may include a number of components, a processor 604 and at least one communication chip 606. In various embodiments, the processor 604 may be a processor core. In various embodiments, the at least one communication chip 606 may also be physically and electrically coupled to the processor 604. In further implementations, the communication chip 606 may be part of the processor 604. In various embodiments, computing device 600 may include printed circuit board ("PCB") 602. For these embodiments, processor 604 and communication chip 606 may be disposed thereon. In alternate embodiments, the various components may be coupled without the employment of PCB 602.

Depending on its applications, computing device 600 may include other components that may or may not be physically and electrically coupled to the PCB 602. These other components include, but are not limited to, volatile memory (e.g., dynamic random access memory 608, also referred to as "DRAM"), non-volatile memory (e.g., read only memory 610, also referred to as "ROM"), flash memory 612, a graphics processor 614, a digital signal processor (not shown), a crypto processor (not shown), an input/output ("I/O") controller 616, an antenna 618, a display (not shown), a touch screen display 620, a touch screen controller 622, a battery 624, an audio codec (not shown), a video codec (not shown), a global positioning system ("GPS") device 628, a compass 630, an accelerometer (not shown), a gyroscope (not shown), a speaker 632, a camera 634, and a mass storage device (such as hard disk drive, a solid state drive, compact disk ("CD"), digital versatile disk ("DVD")) (not shown), and so forth. In various embodiments, the processor 604 may be integrated on the same die with other components to form a System on Chip ("SoC").

In various embodiments, volatile memory (e.g., DRAM 608), non-volatile memory (e.g., ROM 610), flash memory 612, and the mass storage device may include programming instructions configured to enable computing device 600, in response to execution by processor(s) 604, to practice all or selected aspects of method 400 and/or 500. For example, one or more of the memory components such as volatile memory (e.g., DRAM 608), non-volatile memory (e.g., ROM 610), flash memory 612, and the mass storage device may include temporal and/or persistent copies of instructions (depicted as a control module 636 in FIG. 6) configured to enable computing device 600 to practice disclosed techniques, such as all or selected aspects of method 400 and/or method 500.

The communication chip 606 may enable wired and/or wireless communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 606 may implement any of a number of wireless standards or protocols, including but not limited to IEEE 802.11 ("WiFi"), IEEE 802.16 ("WiMAX"), IEEE 702.20, Long Term evolution ("LTE"), General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as any other wireless protocols that are designated as 3G, 4G, 5G, and beyond. The computing device 600 may include a plurality of communication chips 606. For instance, a first communication chip 606 may be dedicated to shorter range wireless communications such as Wi-Fi and Bluetooth and a second communication chip 606 may be dedicated to longer range wireless communications such as GPS, EDGE, GPRS, CDMA, WiMAX, LTE, Ev-DO, and others.

In various implementations, the computing device 600 may be a laptop, a netbook, a notebook, an ultrabook, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 600 may be any other electronic device that processes data.

Embodiments of apparatus, computer-implemented methods, systems, devices, and computer-readable media are described herein for facilitation of concurrent consumption of a media content by a first user of a first computing device and a second user of a second computing device. In various embodiments, facilitation may include superimposition of an animation of the second user over the media content presented on the first computing device, based on captured visual data of the second user received from the second computing device. In various embodiments, the animation may be visually emphasized on determination of the first user's interest in the second user. In various embodiments, the determination of the first user's interest may be based on data received from an eye-tracker input device associated with the first computing device.

In various embodiments, a superimposition of an animation of a third user of a third computing device may be visually deemphasized over the media content presented on the first computing device, on determination of the first user's interest in the second user or disinterest in the third user. In various embodiments, the first computing device may render, in shadow, the superimposition of the animation of the third user to visually deemphasize the superimposition of the animation of the third user.

In various embodiments, superimposition of an animation of the second user includes superimposition of the animation of the second user adjacent a bottom side of a display of the first computing device. In various embodiments, parallax correction may be employed on the superimposition of the animation of the second user.

In various embodiments, textual manifestation of speech of the second user may be superimposed over the media content. In various embodiments, the textual manifestation of speech by the second user may be based on speech-to-text data received from the second computing device or on audio data received from the second computing device. In various embodiments, the superimposition of the animation of the second user may be rendered in a transparent window.

In various embodiments, captured visual data of the first user may be visually altered based at least in part on whether the second user has been assigned a trusted status by the first user. In various embodiments, the captured visual data of the first user may be transmitted to the second computing device. In various embodiments, the captured visual data may be configured to cause the second computing device to superimpose an animation of the first user over the media content displayed on the second computing device.

In various embodiments, the conditional alteration may include image processing of the captured visual data of the first user, the image processing comprising blurring, pixelization, background subtraction, or frame removal. In various embodiments, the captured visual data of the first user may be altered responsive to a determination that the second user has not been assigned a trusted status by the first user.

In various embodiments, at least some of the captured visual data of the first or second user may be automatically cropped. In various embodiments, the at least some of the captured visual data of the first or second user may be dynamically cropped, based on a determination that a region of the visual data in which the first or second user is represented occupies less than a predetermined portion of the entirety of the captured visual data of the first or second user.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A computer-implemented method, comprising:
    receiving, by a first computing device used by a first user, captured visual data of a second user received from a second computing device;
    presenting, on the first computing device, a media content concurrently with presentation of the media content on the second computing device;
    determining, by the first computing device, an interest or disinterest of the first user in the second user of the second computing device;
    superimposing, by the first computing device, of an animation of the second user, over the media content presented on the first computing device, based on the captured visual data of the second user; and
    visually emphasizing or deemphasizing, by the first computing device, the animation based on a result of the determination.

2. The computer-implemented method of claim 1, further comprising:
    conditionally altering, by the first computing device, captured visual data of the first user based at least in part on whether the first user has assigned a trusted status to the second user; and
    transmitting, by the first computing device, the visual data to the second computing device, the captured visual data being transmitted to cause the second computing device to superimpose an animation of the first user over the media content displayed on the second computing device.

3. The computer-implemented method of claim 2, wherein conditionally altering the captured visual data of the first user comprises performing image processing on the captured visual data, the image processing comprising blurring, pixelization, background subtraction, or frame removal.

4. The computer-implemented method of claim 2, wherein conditionally altering the captured visual data of the first user comprises altering the visual data responsive to a determination that the second user has not been assigned a trusted status by the first user.

5. The computer-implemented method of claim 2, further comprising automatically cropping, by the first computing device, at least some of the captured visual data of the first or second user.

6. The computer-implemented method of claim 2, wherein determining the first user's interest comprises:
    receiving eye-tracking data from an eye-tracker input device associated with the first computing device; and
    determining, based on the eye-tracking data, a location at which the first user is looking.

7. At least one non-transitory computer-readable medium comprising instructions that, in response to execution by a first computing device used by a first user, cause the first computing device to:
    receive captured visual data of a second user from a second computing device;
    present, on the first computing device, a media content concurrently with presentation of the media content on the second computing device;
    determine an interest or disinterest of the first user in viewing the second user of the second computing device,
    superimpose an animation of the second user, over the media content presented on the first computing device, based on the captured visual data of the second user; and
    visually emphasize or deemphasize the animation based on a result of the determination of the first user's interest in the second user.

8. The at least one non-transitory computer-readable medium of claim 7, further comprising instructions that, in response to execution by the first computing device, cause the first computing device to:
    visually deemphasize an animation of a third user of a third computing device over the media content presented on the first computing device, on determination of the first user's interest in the second user or disinterest in the third user.

9. The at least one non-transitory computer-readable medium of claim 8, further comprising instructions that, in response to execution by the first computing device, cause the first computing device to:

render, in shadow, the superimposition of the animation of the third user to visually deemphasize the superimposition of the animation of the third user.

10. The at least one non-transitory computer-readable medium of claim 7, wherein superimposition of an animation of the second user includes superimposition of the animation of the second user adjacent a bottom side of a display of the first computing device.

11. The at least one non-transitory computer-readable medium of claim 7, further comprising instructions that, in response to execution by the first computing device, cause the first computing device to:

employ parallax correction on the superimposition of the animation of the second user.

12. The at least one non-transitory computer-readable medium of claim 7, further comprising instructions that, in response to execution by the first computing device, cause the first computing device to:

superimpose, over the media content presented on the first computing device, textual manifestation of speech of the second user.

13. The at least one non-transitory computer-readable medium of claim 12, wherein the textual manifestation of speech of the second user is based on speech-to-text data received from the second computing device.

14. The at least one non-transitory computer-readable medium of claim 12, wherein the textual manifestation of speech of the second user is based on audio data received from the second computing device.

15. The at least one non-transitory computer-readable medium of claim 7, further comprising instructions that, in response to execution by the first computing device, cause the first computing device to:

alter captured visual data of the first user based at least in part on whether the second user has been assigned a trusted status by the first user; and transmit, to the second computing device, the captured visual data of the first user to cause the second computing device to superimpose an animation of the first user over the media content displayed on the second computing device.

16. The at least one non-transitory computer-readable medium of claim 15, wherein the conditional alteration includes image processing of the captured visual data of the first user, the image processing comprising blurring, pixelization, background subtraction, or frame removal.

17. The at least one non-transitory computer-readable medium of claim 15, wherein alter captured visual data of the first user comprises alter the captured visual data of the first user responsive to a determination that the second user has not been assigned a trusted status by the first user.

18. The at least one non-transitory computer-readable medium of claim 15, further comprising instructions that, in response to execution by the first computing device, cause the first computing device to:

crop at least some of the captured visual data of the first or second user.

19. The at least one non-transitory computer-readable medium of claim 18, further comprising instructions that, in response to execution by the first computing device, cause the first computing device to:

crop the at least some of the captured visual data of the first or second user based on a determination that a region of the visual data in which the first or second user is represented occupies less than a predetermined portion of an entirety of the captured visual data of the first or second user.

20. The at least one non-transitory computer-readable medium of claim 7, wherein to determine the first user's interest comprises:

receive eye-tracking data from an eye-tracker input device associated with the first computing device; and determine, based on the eye-tracking data, a location at which the first user is looking.

21. A system, comprising:

one or more processors;

memory operably coupled to the one or more processors;

a display; and a control module contained in the memory and to be operated by the one or more processors to facilitate concurrent consumption of a media content by a first user of the system and a second user of a remote computing device, wherein facilitation includes superimposition of an animation of the second user over the media content presented on the display, based on captured visual data of the second user received from the remote computing device, wherein the animation is visually emphasized on determination of the first user's interest in viewing the animation of the second user.

22. The system of claim 21, wherein the remote computing device is a first remote computing device, and the control module is to further visually deemphasize an animation of a third user of a second remote computing device over the media content presented on the display, on determination of the first user's interest in the second user or disinterest in the third user.

23. The system of claim 22, wherein the control module is to further render, in shadow, the animation of the third user.

24. The system of claim 21, wherein superimposition of an animation of the second user includes superimposition of the animation of the second user adjacent a bottom side of the display.

25. The system of claim 21, wherein the determination of the first user's interest is based on data received from an eye-tracking device.

\* \* \* \* \*